(12) United States Patent
Cho et al.

(10) Patent No.: US 11,989,927 B2
(45) Date of Patent: May 21, 2024

(54) APPARATUS AND METHOD FOR DETECTING KEYPOINT BASED ON DEEP LEARNING USING INFORMATION CHANGE ACROSS RECEPTIVE FIELDS

(71) Applicants: ELECTRONICS AND TELECOMMUNICATIONS RESEARCH INSTITUTE, Daejeon (KR); Information Technology University (ITU), Lahore (PK)

(72) Inventors: Yong-Ju Cho, Daejeon (KR); Jeong-Il Seo, Daejeon (KR); Rehan Hafiz, Lahore (PK); Mohsen Ali, Lahore (PK); Muhammad Faisal, Lahore (PK); Usama Sadiq, Lahore (PK); Tabasher Arif, Lahore (PK)

(73) Assignees: ELECTRONICS AND TELECOMMUNICATIONS RESEARCH INSTITUTE, Daejeon (KR); INFORMATION TECHNOLOGY UNIVERSITY (ITU), Lahore (PK)

( * ) Notice: Subject to any disclaimer, the term of this patent is extended or adjusted under 35 U.S.C. 154(b) by 204 days.

(21) Appl. No.: 17/565,901

(22) Filed: Dec. 30, 2021

(65) Prior Publication Data

US 2023/0035307 A1 Feb. 2, 2023

(30) Foreign Application Priority Data

Jul. 14, 2021 (KR) .......................... 10-2021-0092530

(51) Int. Cl.
*G06V 10/77* (2022.01)
*G06T 3/4007* (2024.01)
(Continued)

(52) U.S. Cl.
CPC ........ *G06V 10/7715* (2022.01); *G06T 3/4007* (2013.01); *G06V 10/443* (2022.01); *G06V 10/82* (2022.01)

(58) Field of Classification Search
CPC .. G06V 10/7715; G06V 10/443; G06V 10/82; G06T 3/4007
(Continued)

(56) References Cited

U.S. PATENT DOCUMENTS 10,621,779 B1 * 4/2020 Topiwala ................. G06N 3/08
10,733,744 B2    8/2020 Ha et al.
(Continued)

OTHER PUBLICATIONS

Youngju Cho et al.; "Learning to Detect Local Features using Information Change"; IEEE Access, vol. X, 2020; pp. 1-29; 2021.

*Primary Examiner* — Michael R Neff
(74) *Attorney, Agent, or Firm* — KILE PARK REED & HOUTTEMAN PLLC (57) ABSTRACT

Disclosed herein are an apparatus and method for detecting a keypoint based on deep learning robust to scale changes based on information change across receptive fields. The apparatus for detecting a keypoint based on deep learning robust to scale changes based on information change across receptive fields includes a feature extractor for extracting a feature from an input image based on a pre-trained deep learning neural network, an information accumulation pyramid module for outputting, from the feature, at least two filter responses corresponding to receptive fields having different scales, an information change detection module for calculating an information change between the at least two filter responses, a keypoint detection module for creating a score map having a keypoint probability of each pixel based on the information change, and a continuous scale estimation module for estimating a scale of a receptive field having a biggest information change for each pixel.

17 Claims, 7 Drawing Sheets

(51) Int. Cl.
*G06V 10/44* (2022.01)
*G06V 10/82* (2022.01)

(58) Field of Classification Search
USPC .......................................................... 382/157
See application file for complete search history.

(56) References Cited

U.S. PATENT DOCUMENTS

| | | |
|---|---|---|
| 2011/0170780 A1 | 7/2011 | Vaddadi et al. |
| 2017/0344808 A1* | 11/2017 | El-Khamy ............ G06V 40/161 |
| 2019/0114510 A1 | 4/2019 | Bremer et al. |
| 2020/0250807 A1 | 8/2020 | Hong et al. |
| 2020/0327701 A1 | 10/2020 | Zhou et al. |
| 2021/0215789 A1* | 7/2021 | Hu ........................... G01S 7/415 |
| 2022/0026519 A1* | 1/2022 | Wu .......................... G01S 7/006 |
| 2022/0292827 A1* | 9/2022 | Chen ................... G06F 16/7867 |

* cited by examiner

APPARATUS AND METHOD FOR DETECTING KEYPOINT BASED ON DEEP LEARNING USING INFORMATION CHANGE ACROSS RECEPTIVE FIELDS

CROSS REFERENCE TO RELATED APPLICATION

This application claims the benefit of Korean Patent Application No. 10-2021-0092530, filed Jul. 14, 2021, which is hereby incorporated by reference in its entirety into this application.

BACKGROUND OF THE INVENTION

1. Technical Field

The following embodiments relate to technology for detecting keypoints defining a region of interest in an image.

2. Description of the Related Art

A keypoint detection technology is widely used as an elementary key technology in a tangible media (e.g., computer vision) field such as camera pose estimation, ultra wide vision, 360 virtual reality (VR), and three-dimensional (3D) image reconstruction (or point cloud).

Keypoint detection is a classical computer vision issue, which has thus far been mainly treated in traditional handcrafted manners such as scale-invariant features transform (SIFT), speeded-up robust features (SURF) and oriented fast and rotated BRIEF (ORB).

In the meantime, as deep learning technologies stand out these days, the keypoint detection technology is also rapidly evolving from the traditional handcrafted method to a deep learning-based method. The deep learning-based key point detection technology are narrowing the gap in performance with the keypoint detection technology based on the handcrafted method, and even shows better performance in some aspects.

The deep learning-based keypoint detection technology is, however, still far behind the keypoint detection technology based on the handcrafted method in terms of main performance such as repeatability and matching score.

For example, the classical keypoint detection method such as SIFT includes extracting keypoints first, performing description of the extracted key points, and matching two keypoints of different images. In this case, the key points are basically featured points in an image, implying information (e.g., a scale) about how large a boundary region they are in. The deep learning-based keypoint detection technology needs to be designed to have a structure of extracting keypoints with scale information contained therein instead of extracting only the keypoints, in order to improve keypoint description and matching performance.

SUMMARY OF THE INVENTION

An embodiment is intended to provide an apparatus and method of deep learning-based keypoint detection which replaces the existing handcrafted keypoint detection technology by improving the deep learning-based keypoint detection in terms of main performance such as repeatability and matching score.

In accordance with an aspect, there is provided an apparatus for detecting a keypoint based on deep learning robust to scale changes based on information change across receptive fields, the apparatus including a feature extractor for extracting a feature from an input image based on a pre-trained deep learning neural network; an information accumulation pyramid module for outputting, from the feature, at least two filter responses corresponding to receptive fields having different scales, an information change detection module for calculating an information change between the at least two filter responses, a keypoint detection module for creating a score map having a keypoint probability of each pixel based on the information change, and a continuous scale estimation module for estimating a scale of a receptive field having a biggest information change for each pixel.

The information accumulation pyramid module may include a feature transformation block for transforming a resolution of the feature output from the feature extractor into a resolution that is capable of being handled by the feature transformation block.

The feature transformation block may include an up-sampler for bilinearly interpolating a feature volume indicating feature maps on a plurality of channels output from the feature extractor, and a plurality of convolutional layers for transforming a size of the bilinearly interpolated feature volume into a feature volume available for input, which is designed for keypoint extraction, and outputting a result of the transforming.

The information accumulation pyramid module may be configured such that at least two convolutional filters in different sizes are arranged in parallel at a rear end of the feature transformation block in order of size.

When the at least two convolutional filters are N in number, where N is a natural number, a size of a k-th convolutional filter may be 2k+1, where k is an integer ranging from 0 to N−1.

The information change detection module may be configured to calculate an information change indicating a difference between filter responses output from neighboring convolutional filters, and when the at least two convolutional filters are N in number, where N is a natural number, an information change volume may have a depth of N−1.

The keypoint detection module may include a first convolutional layer including a plurality of convolutional filters and configured to extract a feature volume of a plurality of channels by linearly combining information changes between filter responses for each pixel from the information change volume, and a second convolutional layer including a single filter and configured to transform features of the plurality of channels output from the first convolutional layer into a feature map of a single channel.

The continuous scale estimation module may be configured to estimate a scale corresponding to a keypoint for each pixel as a continuous value in a real number range based on a weight for a scale of a receptive field for each pixel.

In accordance with another aspect, there is provided a method for detecting a keypoint based on deep learning robust to scale changes based on information change across receptive fields, the method including extracting a feature from an input image based on a pre-trained deep learning neural network, outputting, from the feature, at least two filter responses corresponding to receptive fields having different scales, calculating an information change between the at least two filter responses, creating a score map having a keypoint probability of each pixel based on the information change, and estimating a scale of a receptive field having a biggest information change for each pixel.

The method may further include transforming a resolution of the feature extracted from the input image into a feature of a resolution that is capable of being handled.

Transforming the resolution may include bilinearly interpolating a feature volume indicating feature maps of a plurality of channels, and transforming a size of the bilinearly interpolated feature volume into a feature volume available for input, which is designed for keypoint extraction.

Outputting the filter responses may include filtering a feature transformed by each of at least two convolutional filters having different sizes and arranged in parallel in order of size.

When the at least two convolutional filters are N in number, where N is a natural number, a size of a k-th convolutional filter may be 2k+1, where k is an integer ranging from 0 to N−1.

Calculating the information change may include calculating an information change indicating a difference between filter responses output from neighboring convolutional filters, and when the at least two convolutional filters are N in number, where N is a natural number, an information change volume may have a depth of N−1.

Creating the score map may include extracting, by a plurality of convolutional filters, features on a plurality of channels by linearly combining information changes between filter responses for each pixel from the information change volume, and transforming, by a single filter, the features of the plurality of channels into a feature on a single channel.

Estimating the scale may include estimating a scale corresponding to a keypoint for each pixel as a continuous value in a real number range based on a weight for a scale of a receptive field for each pixel.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for detecting a keypoint based on deep learning using information change across receptive fields according to embodiments will now be described with reference to FIGS. 1 to 7.

In the embodiments of the disclosure, a keypoint may be defined as including a point in a region having a big information change between neighboring scales as the scale of a receptive field, which is a target for filtering of an input image, changes sequentially, and a scale corresponding to the point, i.e., a scale of a receptive field having a big information change.

In other words, in the embodiments of the disclosure, with scale changes of receptive fields of features extracted by deep convolutional neural network (D-CNN) from the input image rather than scale changes in image size itself, a position of a point having a big difference between local features representative of receptive fields and a scale of a corresponding receptive field are discovered.

Figure 1:
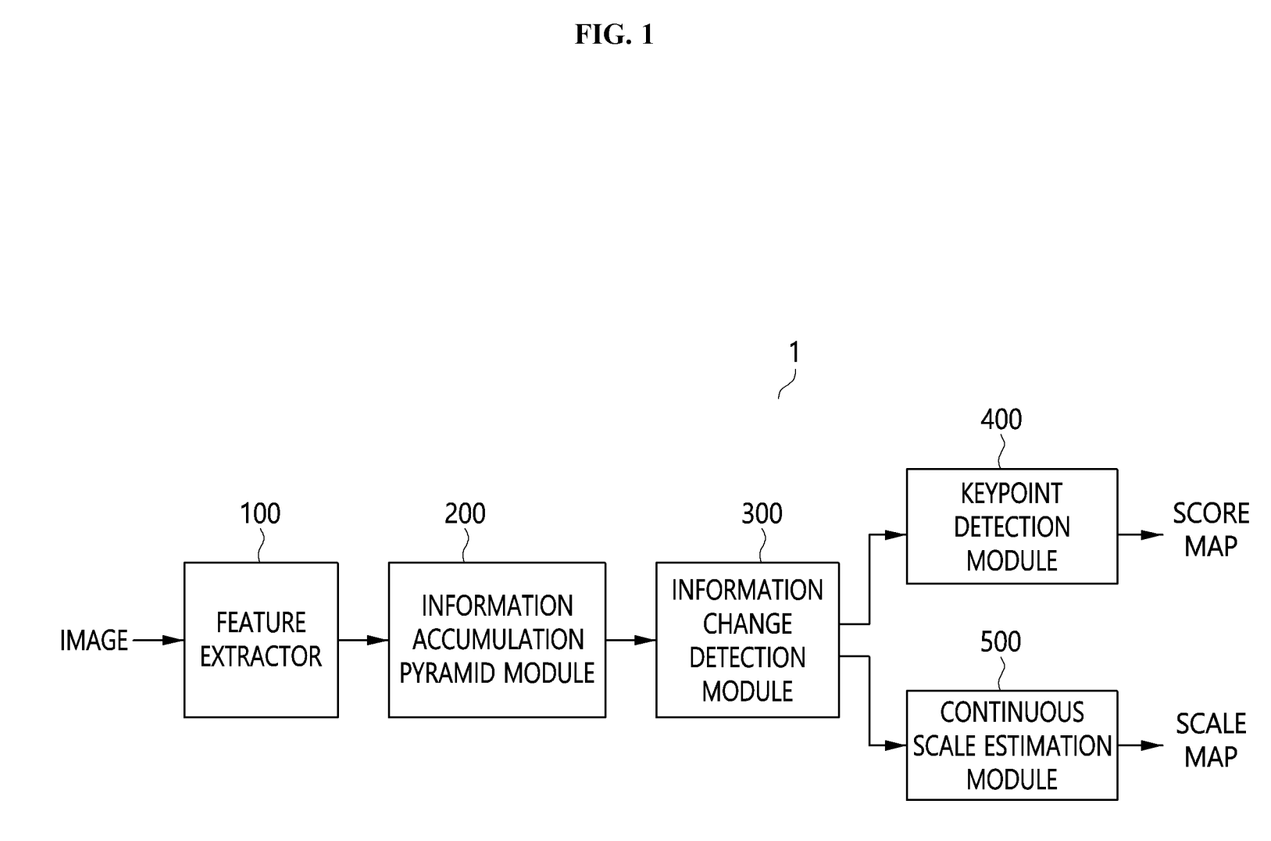
FIG. 1 is a schematic block diagram of an apparatus for detecting a keypoint based on deep leaning using information change across receptive fields according to an embodiment.

FIG. 1 is a schematic block diagram of an apparatus for detecting a keypoint based on deep leaning using information change across receptive fields according to an embodiment.

Referring to FIG. 1, an apparatus for detecting a keypoint based on deep learning that is robust to scale changes based on information change across receptive fields (hereinafter, briefly referred to as an apparatus) in an embodiment may include a feature extractor (e.g., a deep learned feature extractor) 100, an information accumulation pyramid module (IAPM) 200, an information change detection module (ICDM) 300, a keypoint detection module (KDM) 400, and a continuous scale estimation module 500.

The feature extractor 100 may extract and output a feature from an input image for interference.

The feature extractor 100 may be a convolutional neural network (CNN) based network which is trained in advance to extract a feature from an image. For example, the feature extractor 100 may include all deep learning neural networks capable of extracting a feature from an image, such as ResNet-50, VGG, Google-Net, ImageNet, etc.

The information accumulation pyramid module 200 may output, from the feature, at least two convolutional filter responses corresponding to receptive fields having different scales.

In this case, the spatial resolution may be different from a resolution designed for subsequent keypoint detection, depending on the number of channels of the feature extracted by the feature extractor 100. The information accumulation pyramid module 200 may further include a function of transforming the resolution of the feature output from the feature extractor 100 into a resolution that can be handled by the function.

The information change detection module 300 may calculate an information change between at least two filter responses output from the information accumulation pyramid module 200. That is, the information change detection module 300 may calculate a difference between neighboring convolutional filter responses.

The information accumulation pyramid module 200 and the information change detection module 300 will be described later in detail in connection with FIGS. 2 and 3.

The keypoint detection module 400 may create a score map having a keypoint probability of each pixel based on the information change output from the information change detection module 300. The keypoint detection module 400 will be described later in detail in connection with FIG. 4.

The continuous scale estimation module 500 may estimate a scale of a receptive field having the biggest information change for each pixel based on information changes output from the information change detection module 300. The continuous scale estimation module 500 will be described later in detail in connection with FIG. 5.

Figure 2:
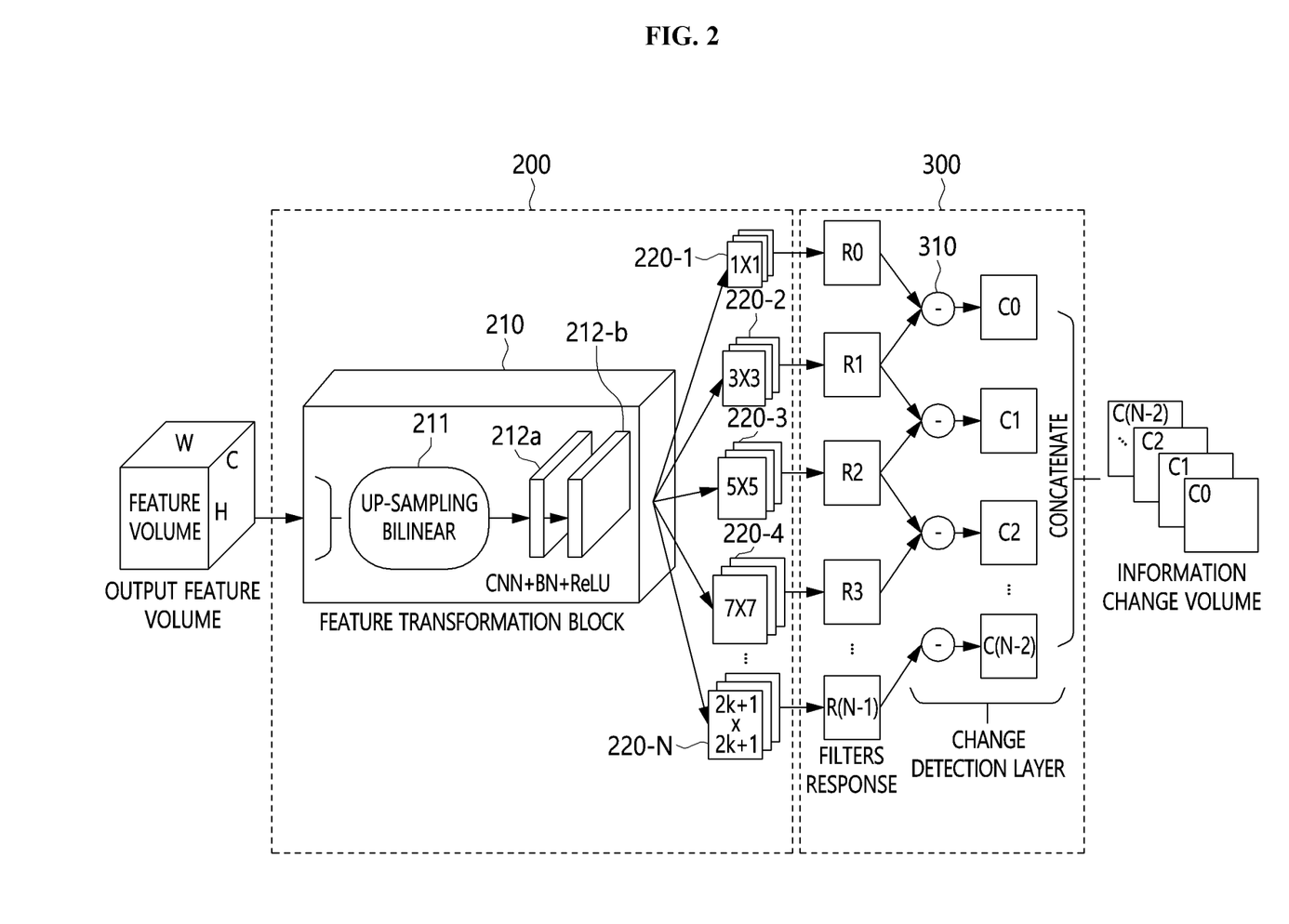
FIG. 2 is a detailed block diagram of an information accumulation pyramid module and an information change detection module according to an embodiment.
Figure 3:
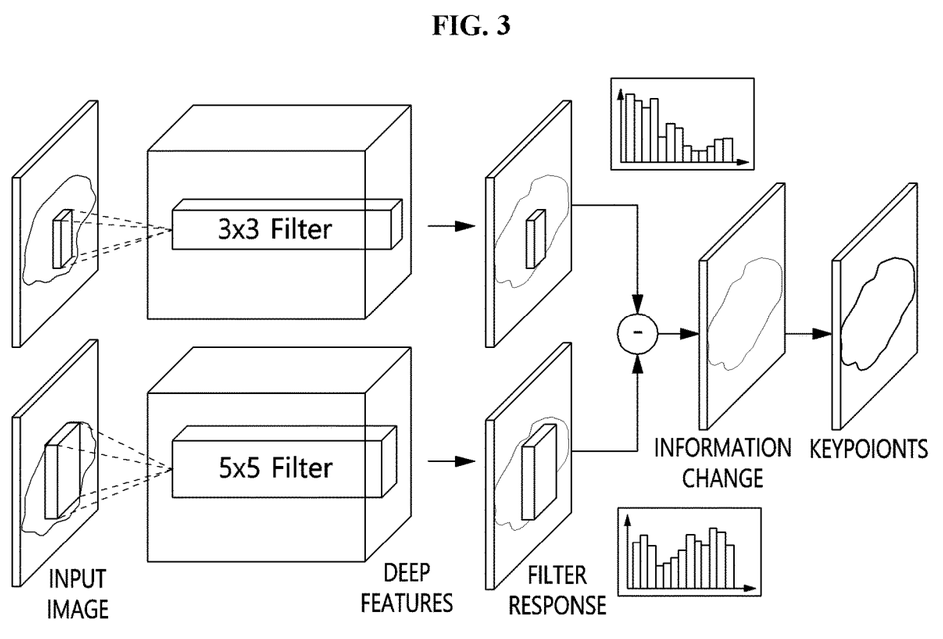
FIG. 3 illustrates the information accumulation pyramid module and the information change detection module according to an embodiment.

FIG. 2 is a detailed block diagram of the information accumulation pyramid module 200 and the information change detection module 300 according to an embodiment, and FIG. 3 illustrates the information accumulation pyramid module 200 and the information change detection module 300 according to an embodiment.

Referring to FIG. 2, the information accumulation pyramid module 200 according to an embodiment may include a feature transformation block 210 and at least two convolutional filters 220-1, 220-2, 220-3, 220-4, . . . , 220-N.

The feature transformation block 210 may transform an output feature volume from the feature extractor 100, which has feature maps of a certain size created in a plurality of channels, into a resolution designed for identifying a keypoint in the subsequent elements.

Specifically, the feature transformation block 210 may include a bilinear upsampling layer 211 for bilinearly interpolating the feature volume indicating the feature maps of the plurality of channels output from the feature extractor 100, and two convolutional layers 212a and 212b for transforming the size of the linearly interpolated feature volume into a feature volume available for input, which is designed for keypoint extraction and output the result of the transforming.

In this case, the convolutional layers 212a and 212b may be trained to transform the input feature volume into a form available for keypoint identification.

Furthermore, there may be layers for performing batch normalization (BL) and ReLu functions arranged at rear ends of the two convolutional layers 212a and 212b, respectively.

The BL may be performed to normalize a distribution of input values on each layer of the neural network to help training.

The ReLu function is an activation function that outputs '0' when the input value is equal to or less than '0' and outputs a linear value when the input value is greater than '0'.

The at least two convolutional filters 220-1, 220-2, 220-3, 220-4, . . . , 220-N have different dimensions (also referred to as sizes), and may be arranged behind the feature transformation block 210 in order of size to be connected thereto in parallel.

When the number of the at least two convolutional filters 220-1, 220-2, 220-3, 220-4, . . . , 220-N is N, where N is a natural number, a convolutional filter arranged in a k-th place may have a size of 2k+1. In this case, k=0, 1, 2, 3, . . . N−1.

For example, as shown in FIG. 2, the convolutional filters 220-1 to 220-N may be connected in parallel in order of size, i.e., 1, 3, 5, 7, . . . , 2k+1.

The convolutional filters 220-1, 220-2, 220-3, 220-4, . . . , 220-N may each output a filter response for a receptive field of a corresponding scale. In this case, the number of channels may vary.

For example, in a case that a convolutional filter has a size of 3×3, it may output a representative value of 9 points as a result of the filtering, and with repetition of the filtering, a value of the pixel managed by the respective convolutional filters may be different. Accordingly, depending on the size of the convolutional filter, a size of a region represented by a pixel value finally output, i.e., a scale of a receptive field, is different.

Hence, an embodiment is to change the scale by using receptive fields, set a point having the biggest change between response values of receptive fields among center points of the receptive fields as a keypoint, and discover a scale of the receptive field having the biggest change.

In this case, $R_k$ is a response of the k-th convolutional filter, and in FIG. 2, $R_0, R_1, R_2, R_3, \ldots, R_{N-1}$ are shown as outputs from the convolutional filters 220-1, 220-2, 220-3, 220-4, . . . , 220-N.

The information change detection module 300 may output an information change volume by comparing filter responses output from the information accumulation pyramid module 200.

Specifically, the information change detection module 300 calculates a difference $C_k$ between neighboring k-th filter response $R_k$ and k+1-th filter response $R_{k+1}$ through a subtractor 310 as in the following Equation (1):

$$C_k = R_{k+1} - R_k \qquad (1)$$

For example, referring to FIG. 3, an information change between a response of a 5×5 filter and a response of a 3×3 filter is output.

The information change detection module 300 may output N−1 information changes $C_0, C_1, C_2, C_3, \ldots, C_{N-2}$ by applying Equation (1) to all the neighboring filter responses of all the N filter responses $R_0, R_1, R_2, R_3, \ldots, R_{N-1}$.

Accordingly, a set of information change volume output from the information change detection module 300 may be represented by $V \in \mathbb{R}^{H \times W \times N-1}$.

In this case, a resolution of the information change volume is kept in the image size input to the convolutional filters 220-1, 220-2, 220-3, 220-4, . . . , 220-N.

Figure 4:
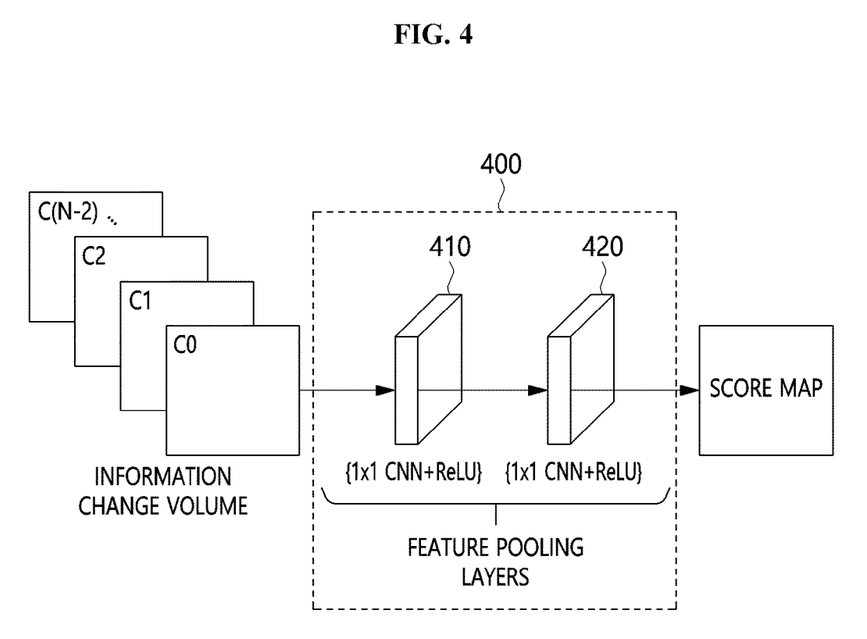
FIG. 4 is a detailed block diagram of a keypoint detection module according to an embodiment.

FIG. 4 is a detailed block diagram of a keypoint detection module 400 according to an embodiment.

Referring to FIG. 4, the keypoint detection module 400 may include a plurality of convolutional layers 410 and 420 for estimating a difference between scales and identifying a pattern representing local keypoints.

For example, the keypoint detection module 400 may include a first convolutional layer 410 having a plurality of filters for extracting a feature volume of multiple channels by linearly combining information changes between filter responses for each pixel from the information change volume, and a second convolutional layer 420 having a single filter for transforming the features of the multiple channels output from the first convolutional layer 410 into a feature map of a single channel.

In other words, the first convolutional layer 410 includes N−1 filters, each size of which may be 1×1×N−1, and each of which may extract an information change in scales for each pixel as a different linear combination.

The second convolutional layer 420 includes a single filter of 1×1×N−1, and outputs a score map S of a single channel including a keypoint score for each pixel from outputs of the first convolutional layer 410.

The activation function ReLU may be applied at the rear end of each of the first and second convolutional layers 410 and 420.

Figure 5:
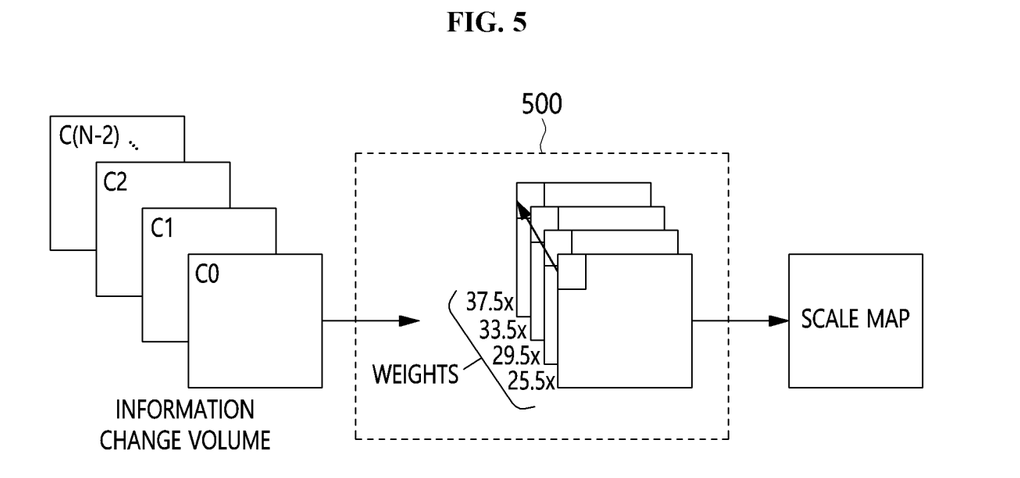
FIG. 5 is a detailed block diagram of a continuous scale estimation module according to an embodiment.

FIG. 5 is a detailed block diagram of a continuous scale estimation module 500 according to an embodiment.

Referring to FIG. 5, the continuous scale estimation module 500 may estimate a scale corresponding to a keypoint for each pixel as a continuous value in a real number range based on a weight for a scale of a receptive field for each pixel.

In an embodiment, the scale of the keypoint is defined in terms of the receptive field of the convolutional filter. In other words, the continuous scale estimation module 500 outputs a scale of a receptive field having the biggest information change for each pixel. For example, when $C_3$ has the biggest value for a particular pixel, the scale of the receptive field for the pixel may correspond to the filter response $R_2$.

As the scale of the receptive field has a discrete value rather than a continuous value, the continuous scale estimation module 500 according to an embodiment may estimate a scale corresponding to a keypoint for each pixel as a continuous value in a real number range based on a weight for a scale of a receptive field for each pixel of the image.

Specifically, to calculate a scale map $U \in R^{H \times W}$, the continuous scale estimation module 500 discovers a scale having the biggest information change by applying weights to receptive fields using information changes between scales captured from the information change volume output from the information change detection module 300. In other words, u(i, j) may be a scale of corresponding keypoint at a candidate pixel (i, j), which may be calculated as in the following Equation (2):

$$u(i, j) = \frac{\sum_{k=0}^{N-2} w_{i,j}^k \cdot r^k}{\sum_{k=0}^{N-2} w_{i,j}^k} \quad (2)$$

In Equation (2), $w_{i,j}^k$=V(i, j, k), k=0, 1, 2, . . . N−2, and $r_k$ is a filter response of a k-th receptive field. As such, scale-space for the keypoint for each pixel may be continuously created like e.g., u(i, j)∈[$r_0$, $r_{N-1}$].

Figure 6:
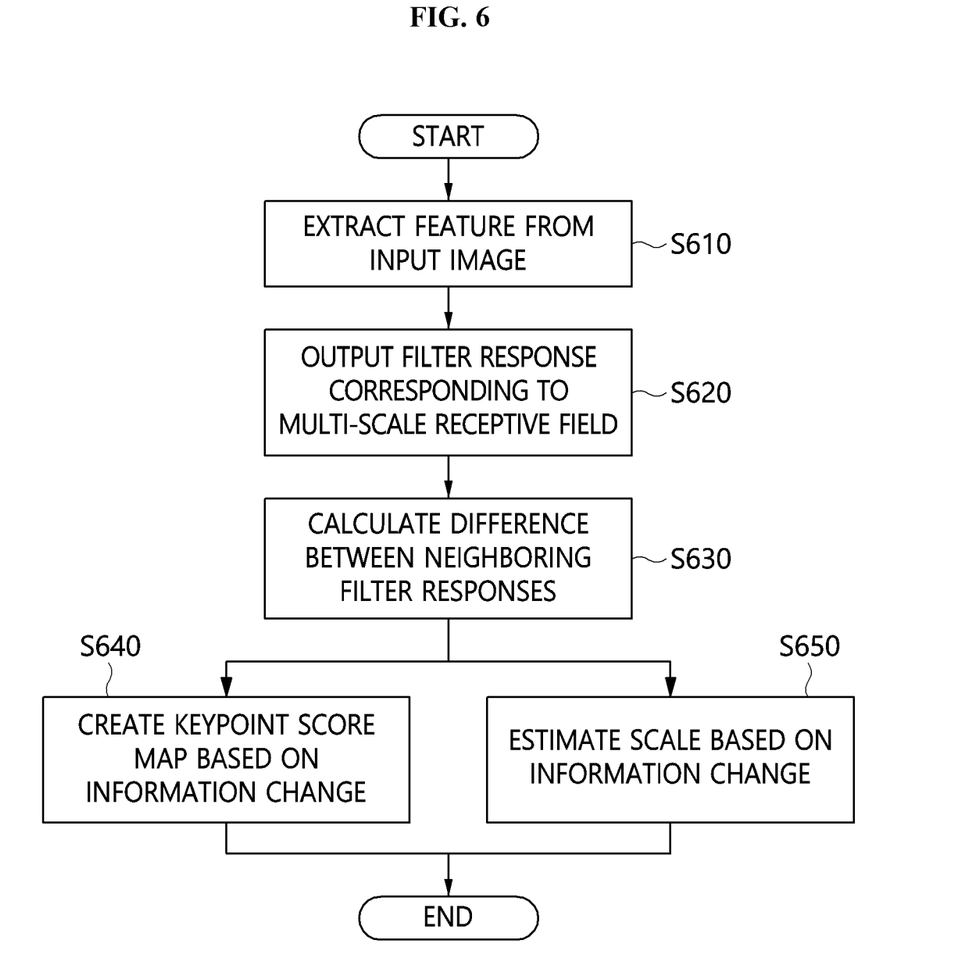
FIG. 6 is a flowchart for explaining a method for detecting a keypoint based on deep leaning using information change across receptive fields according to an embodiment.

FIG. 6 is a flowchart for explaining a method for detecting a keypoint based on deep leaning using information change across receptive fields according to an embodiment.

Referring to FIG. 6, a method for detecting a keypoint based on deep learning using information change across receptive fields according to an embodiment may include extracting a feature from an input image based on a pre-trained deep learning neural network at step S610, outputting at least two filter responses corresponding to receptive fields having different scales from the feature at step S620, calculating an information change between the at least two filter responses at step S630, creating a score map having a keypoint probability of each pixel based on the information change at step S640, and estimating a scale of a receptive field having a biggest information change for each pixel at step S650.

Although not shown, the method for detecting a keypoint based on deep learning using information change across receptive fields according to an embodiment may further include transforming a resolution of the feature extracted from the input image into a feature of a resolution available for processing.

The transforming may include bilinearly interpolating a feature volume indicating feature maps of a plurality of channels, and transforming a size of the bilinearly interpolated feature volume into a feature volume to be input, which is designed for keypoint detection. Details of this are the same as what are described above in connection with FIG. 2, so the description thereof will not be repeated.

The outputting the filter responses at step S620 may include filtering the feature transformed by each of the at least two convolutional filters having different sizes and arranged in parallel in order of size.

When the at least two convolutional filters are N in number, where N is a natural number, a size of a k-th convolutional filter may be 2k+1, where k is an integer ranging from 0 to N−1.

The calculating the information change at step S630 may include calculating an information change indicating a difference between filter responses output from neighboring convolutional filters, and when the at least two convolutional filters are N in number, where N is a natural number, an information change volume may have a depth of N−1.

Details of steps S620 and S630 are the same as what are described above in connection with FIGS. 2 and 3, so the description thereof will not be repeated.

The creating of the score map at step S640 may include extracting, by a plurality of convolutional filters, a feature of a plurality of channels by linearly combining the information changes between filter responses for each pixel from the information change volume, and transforming, by a single filter, the feature of the plurality of channels into a feature of the single channel. Details of step S640 are the same as what are described above in connection with FIG. 4, so the description thereof will not be repeated.

The estimating of the scale at step S650 may include estimating a scale corresponding to a keypoint for each pixel as a continuous value in a real number range based on a weight for a scale of a receptive field for each pixel. Details of step S650 are the same as what are described above in connection with FIG. 5, so the description thereof will not be repeated.

Meanwhile, the apparatus for detecting a keypoint based on deep learning using information change across receptive fields according to an embodiment may be a deep learning network for keypoint detection, which may be trained based on an unsupervised leaning method rather than a supervised learning method in a training stage.

In the supervised learning method, it is common to train the neural network only with a predefined number of pre-labeled training data sets.

Specifically, the supervised learning method may include inputting a predefined number of training data to the neural network and adjusting parameters of the neural network based on gradient descent to minimize a loss of an output value of the neural network from a labeled correct value.

In the apparatus according to embodiments of the disclosure, a new training data set with adjusted size, rotation and perspectivity is created by applying an image transformation method called homography not only to the predefined number of pre-labeled training data sets but also to other training data sets. Accordingly, there may be a significant increase in number of the training data sets.

In the training data set, original training data may be labeled to correspond to labeled correct values.

Furthermore, the apparatus according to an embodiment may continue to learn based on the newly created training data set, thereby having much better performance than in supervised learning methods.

Figure 7:
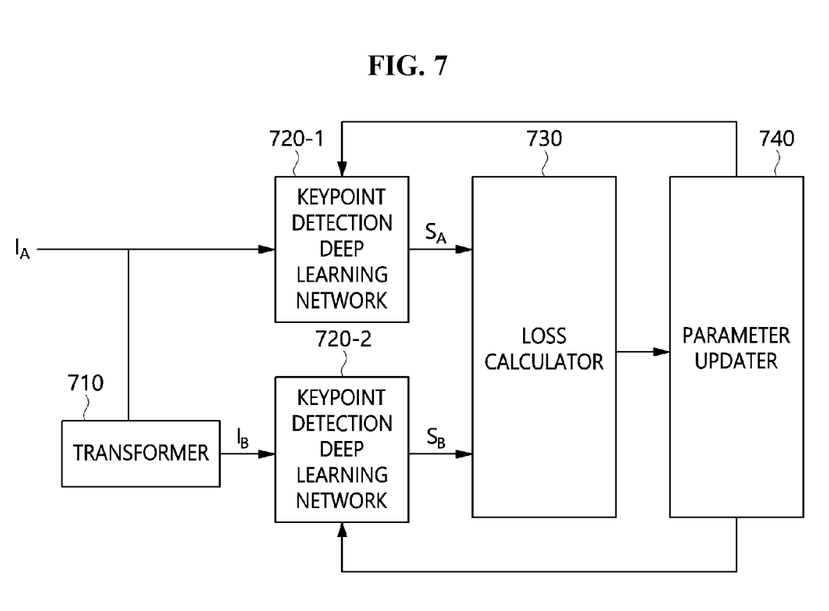
FIG. 7 is a diagram for explaining non-supervised training of a keypoint detection deep learning network according to an embodiment.

FIG. 7 is a diagram for explaining non-supervised training of a keypoint detection deep learning network according to an embodiment.

Referring to FIG. 7, a transformer 710 may apply geometric transformation or photometric transformation $T_{A,B}$ to image $I_A$ given as training data to create transformed image $I_B$. In this case, no descriptor head is labeled on the transformed image $I_B$.

Accordingly, the input image $I_A$ and the transformed image $I_B$ output from the transformer 710 are entered to keypoint detection deep learning networks 720-1 and 720-2, respectively, which are designed according to an embodiment. The keypoint detection deep learning networks 720-1 and 720-2 may create their respective score maps $S_A$ and $S_B$.

Although the image $I_A$ and the transformed image $I_B$ are shown as being entered to the two keypoint detection deep learning networks 720-1 and 720-2 in parallel, it is merely an example for help understanding of the disclosure and the disclosure is not limited thereto. For example, $S_A$ and $S_B$ may be obtained by a single keypoint detection deep learning network which processes the image $I_A$ and the transformed image $I_B$ sequentially.

A loss calculator 730 may calculate a loss based on the score maps $S_A$ and $S_B$ for the image $I_A$ and the transformed image $I_B$.

In this case, using a similarity loss between the score maps $S_A$ and $S_B$ for the two images may prevent improvement of keypoint location discovery performance. Hence, for better keypoint location discovery, embodiments of the disclosure are limited to keypoint location discovery using a covariant constraint loss.

In this case, for the covariant constraint loss, a covariant loss used in KeyNet may be used. KeyNet has once proposed a multi-scale index proposal layer by using a covariant constraint loss combined with local and global information.

Specifically, the loss calculator 730 may divide the score maps $S_A$ and $S_B$ output from the keypoint detection deep learning networks 720-1 and 720-2, respectively, into respective non-overlapping N×N windows, to calculate a loss function. For each window, a position having the largest score may be calculated by performing weighted summation of position and score values. This may lead to the same result from operation in non-maximum suppression (NMS). Furthermore, calculation of a position of the largest score may be done by a Softargmax layer.

Specifically, given that image pair ($I_A$, $I_B$) and homography $H_{A,B}$ between the images, a covariant loss is defined by L2 norm of coordinates derived by the Softargmax layer and an actual max coordinates derived by NMS in the windows corresponding to the score maps $S_A$ and $S_B$.

That is, the covariant loss $\mathcal{L}_{cc}$ of each window of the score map may be defined as in the following Equation (3):

$$\mathcal{L}_{cc}(S_A, S_B, H_{A,B}, N) = \sum_{i=1}^{n_a} \alpha_i \|[x_i, y_i]_A^T - H_{A,B}^{-1}[\hat{x}_i, \hat{y}_i]_B^T\|_2^2 \quad (3)$$

In Equation (3), $\alpha_i$ is a sum of score values at each position of the score maps $S_A$ and $S_B$. When a point has a score high enough to be a keypoint, $\alpha_i$ may increase as well.

A final loss $\mathcal{L}_{TCC}$ may be calculated by summing a in the following Equation (4):

$$\mathcal{L}_{TCC} = \sum_{t=1}^{T} \gamma_t \mathcal{L}_{cc}(S_A, S_B, H_{A,B}, N_t) \quad (4)$$

In Equation (4), $\gamma_t$ is a hyper parameter, which assigns a weight for a loss calculated for each window size.

As described above, once the loss is calculated by the loss calculator 730, a parameter updater 740 may update a neural network parameter of the keypoint detection deep learning networks 720-1 and 720-2 in the same way as in the backpropagation method.

With repetition of the updating of the neural network parameter as described above, the keypoint detection deep learning networks 720-1 and 720-2 may be optimized.

Figure 8:
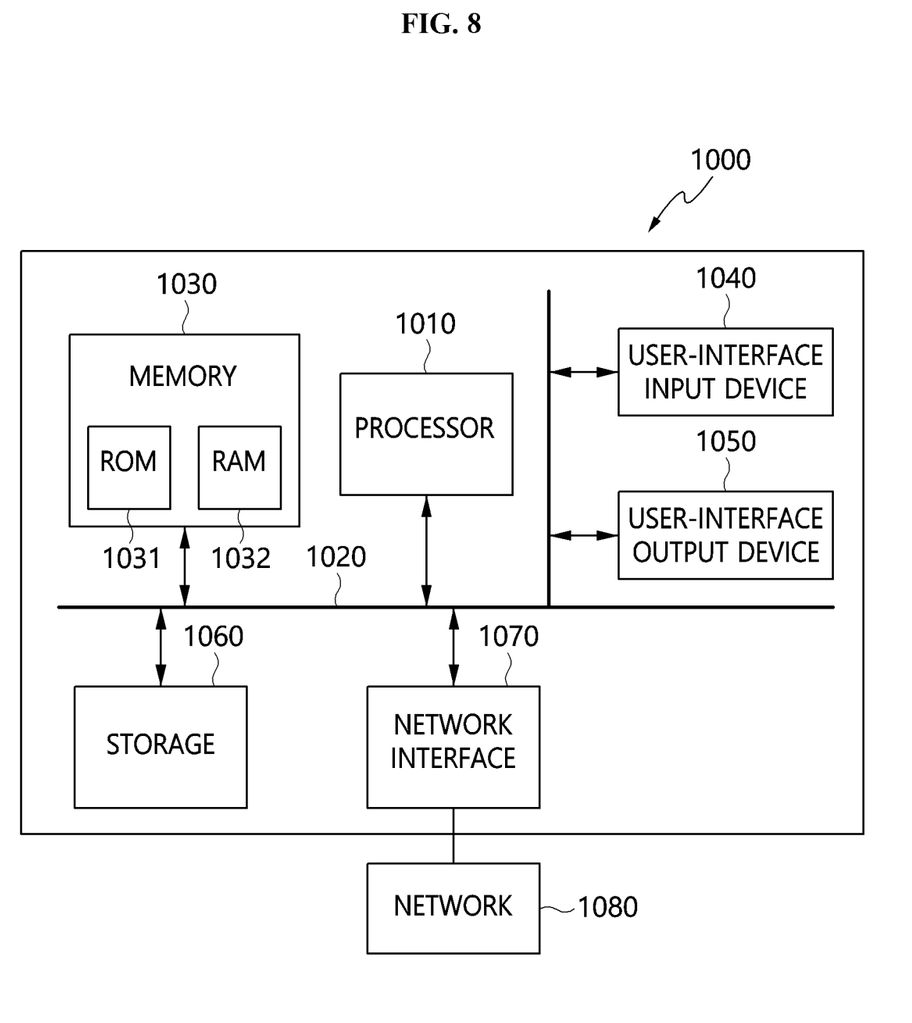
FIG. 8 is a block diagram of a computer system according to an embodiment.

FIG. 8 is a block diagram of a computer system according to an embodiment.

The apparatus for detecting a keypoint based on deep learning using information change across receptive fields or each component of the apparatus may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

According to embodiments, for deep learning-based keypoint detection, the existing handcrafted keypoint detection technology may be replaced by improving the deep learning-based keypoint detection in terms of main performance such as repeatability and matching score. The deep learning-based keypoint detection may be used as an elementary technology to improve creation performance of next generation tangible media such as point cloud or 3D image reconstruction.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for detecting a keypoint based on deep learning robust to scale changes based on information change across receptive fields, the apparatus comprising:
    at least one processor; and
    at least one memory including instructions that when executed by the at least one processor, implement:
    a feature extractor that extracts a feature from an input image based on a pre-trained deep learning neural network;
    an information accumulation pyramid part that outputs, from the feature, at least two filter responses corresponding to receptive fields having different scales;
    an information change detector that calculates an information change between the at least two filter responses;
    a keypoint detector that creates a score map having a keypoint probability of each pixel based on the information change; and
    a continuous scale estimator that estimates a scale of a receptive field having a biggest information change for each pixel.

2. The apparatus of claim 1, wherein the information accumulation pyramid part comprises:
    a feature transformer that transforms a resolution of the feature output from the feature extractor into a resolution that is capable of being handled by the feature transformer.

3. The apparatus of claim 1, wherein the feature transformer comprises:
    an up-sampler that bilinearly interpolates a feature volume indicating feature maps on a plurality of channels output from the feature extractor; and
    a plurality of convolutional layers that transform a size of the bilinearly interpolated feature volume into a feature volume available for input, which is designed for keypoint extraction, and outputting a result of the transforming.

4. The apparatus of claim 2, wherein the information accumulation pyramid part is configured such that at least two convolutional filters in different sizes are arranged in parallel at a rear end of the feature transformer in order of size.

5. The apparatus of claim 4, wherein when the at least two convolutional filters are N in number, where N is a natural number, a size of a k-th convolutional filter is 2k+1, where k is an integer ranging from 0 to N−1.

6. The apparatus of claim 5, wherein:
    the information change detector is configured to calculate an information change indicating a difference between filter responses output from neighboring convolutional filters, and
    when the at least two convolutional filters are N in number, where N is a natural number, an information change volume has a depth of N−1.

7. The apparatus of claim 6, wherein the keypoint detector comprises:
    a first convolutional layer including a plurality of convolutional filters and configured to extract a feature volume of a plurality of channels by linearly combining information changes between filter responses for each pixel from the information change volume; and
    a second convolutional layer including a single filter and configured to transform features of the plurality of channels output from the first convolutional layer into a feature map of a single channel.

8. The apparatus of claim 1, wherein the continuous scale estimator is configured to estimate a scale corresponding to a keypoint for each pixel as a continuous value in a real number range based on a weight for a scale of a receptive field for each pixel.

9. A method for detecting a keypoint based on deep learning robust to scale changes based on information change across receptive fields, the method comprising:
    extracting a feature from an input image based on a pre-trained deep learning neural network;
    outputting, from the feature, at least two filter responses corresponding to receptive fields having different scales;
    calculating an information change between the at least two filter responses;
    creating a score map having a keypoint probability of each pixel based on the information change; and
    estimating a scale of a receptive field having a biggest information change for each pixel.

10. The method of claim 9, further comprising:
    transforming a resolution of the feature extracted from the input image into a feature of a resolution that is capable of being handled.

11. The method of claim 10, wherein transforming the resolution comprises:
    bilinearly interpolating a feature volume indicating feature maps of a plurality of channels; and
    transforming a size of the bilinearly interpolated feature volume into a feature volume available for input, which is designed for keypoint extraction.

12. The method of claim 10, wherein outputting the filter responses comprises filtering a feature transformed by each of at least two convolutional filters having different sizes and arranged in parallel in order of size.

13. The method of claim 12, wherein when the at least two convolutional filters are N in number, where N is a natural number, a size of a k-th convolutional filter is 2k+1, where k is an integer ranging from 0 to N−1.

14. The method of claim 12, wherein calculating the information change comprises:
    calculating an information change indicating a difference between filter responses output from neighboring convolutional filters,
    wherein when the at least two convolutional filters are N in number, where N is a natural number, an information change volume has a depth of N−1.

15. The method of claim 13, wherein creating the score map comprises:
    extracting, by a plurality of convolutional filters, features on a plurality of channels by linearly combining information changes between filter responses for each pixel from the information change volume; and
    transforming, by a single filter, the features of the plurality of channels into a feature on a single channel.

16. The method of claim 9, wherein estimating the scale comprises:

estimating a scale corresponding to a keypoint for each pixel as a continuous value in a real number range based on a weight for a scale of a receptive field for each pixel.

17. A non-transitory computer-readable storage medium storing a program code corresponding to the method for detecting a keypoint based on deep learning robust to scale changes based on information change across receptive fields of claim 9.

\* \* \* \* \*